United States Patent Office 3,072,566
Patented Jan. 8, 1963

3,072,566
SEPARATION PROCESS USING AN AMINO ACID ESTER
Earle C. Makin, Jr., El Dorado, Ark., assignor to Monsanto Chemical Company, St. Louis, Mo., a corporation of Delaware
No Drawing. Filed May 20, 1960, Ser. No. 30,424
14 Claims. (Cl. 208—236)

The present invention relates to the separation of mixtures of two or more compounds by means of a selective solvent. More particularly, this invention relates to the separation of mixtures containing hydrocarbons of varying degrees of saturation by means of solvents selective for the less saturated hydrocarbons.

Whenever mixtures of organic compounds having approximately the same volatilities are encountered, separation by distillation becomes very difficult or in many cases impossible. To fill the gap left by this deficiency of distillation, solvent extraction, extractive distillation, and azeotropic distillation have been developed. These three methods have in common the addition of an outside solvent for the purpose of aiding separation. Only two of these actually depend on the solvent characteristics of a given solvent, however. These are solvent extraction and extractive distillation. Since the solvent then is the key to these two separation methods there is a continuous search for new and improved solvents.

It is an object of this invention to provide a method for the separation of mixtures of two or more compounds by means of a selective solvent. Another object of this invention is to provide a method for the separation of mixtures of two or more organic compounds by means of a selective solvent. A further object of this invention is to provide a method for the separation of saturated hydrocarbons from those less saturated hydrocarbons contained in mixtures thereof, by extraction with a selective solvent. A still further object of this invention is to provide a new and improved solvent for the separation of compounds according to their degree of saturation. A more specific object of this invention is to separate saturated from unsaturated hydrocarbons through the use of a new and improved selective solvent, said solvent being selective for the unsaturated hydrocarbons. Additional objects will become apparent from the description of the invention herein disclosed.

In fulfillment of the objects of this invention, it has been found that mono-carboxylic amino acid derivatives have particular utility as selective solvents. These solvents may be exemplified by the general formula

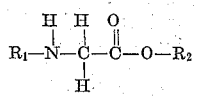

wherein $R_1$ is selected from the group consisting of hydrogen, hydrocarbon radicals of 1 to 10 carbon atoms, and hydrocarbon radicals of 1 to 10 carbon atoms having substituted therein a radical selected from the group of radicals consisting of hydroxy, ether, aldehyde, ketone, ester, sulfide, sulfoxide, sulfone, amine, nitrile, nitro, and halogen radicals and wherein $R_2$ contains 1 to 10 carbon atoms and is chosen from the group consisting of hydrocarbon radicals, oxygen containing hydrocarbon radicals, nitrogen containing hydrocarbon radicals, sulfur containing hydrocarbon radicals and halogen containing hydrocarbon radicals.

The following examples are given to illustrate the invention herein disclosed. It is to be understood that these examples are not to be construed as limiting the application, conditions or operations of this invention.

Example I

Two milliliters of ethyl-N-(3-methoxypropyl) glycinate were placed in a U-shaped tube containing ⅛ inch diameter glass beads. A $C_4$ hydrocarbon stream comprised of 2.3 volume percent isobutanes, 58.0 volume percent n-butane, 18.0 volume percent butenes and 21.6 volume percent butadiene 1,3 was introduced into the U tube. Forty milliliters of the $C_4$ gas were passed through the tube until equilibrium had been obtained. The unabsorbed gas was then analyzed and found to contain only 9.1 volume percent butadiene 1,3. The amount of gas dissolved in the solvent was approximately 16 milliliters.

Example II

Under identical conditions to those described in Example I, ethyl-N-ethyl glycinate was used as the solvent. The resulting concentration of butadiene 1,3 at equilibrium in the unabsorbed gas was 11.1 volume percent. The amount of gas dissolved in the solvent was approximately 20 milliliters.

Example III

Under identical conditions to those described in Example I, ethyl-N-tert-butyl glycinate was used as the solvent. The resulting concentration of butadiene 1,3 at equilibrium in the unabsorbed gas was 15.8 volume percent. The amount of gas dissolved in the solvent was approximately 24 milliliters.

Example IV

A hydrocarbon mixture comprising aromatic hydrocarbons and non-aromatic hydrocarbons within the boiling range of 60–100° C. is thoroughly agitated in a single stage batch mixing apparatus with ethyl-N-ethyl glycinate. The ratio of solvent to hydrocarbon mixture is 2:1. On ceasing the agitation, a raffinate and extract phase forms. The raffinate phase contains a greater concentration of the non-aromatic hydrocarbons than did the initial mixture.

Example V

A hydrocarbon mixture comprising 50 weight percent n-hexane and 50 weight percent hexene-1 is thoroughly agitated in a single stage batch mixing apparatus with ethyl-N-ethyl-glycinate. The ratio of solvent to hydrocarbon mixture is 3:1. On ceasing agitation, a raffinate and extract phase is formed. The raffinate phase contains a greater concentration of n-hexane than did the initial mixture.

Example VI

An organic mixture comprising a hydrocarbon fraction boiling in the gasoline range and 4 percent by weight of sulfur as sulfur bearing compounds is subjected to thorough agitation with ethyl-N-(3-methoxypropyl)glycinate in a ratio of 2 parts by volume of the solvent per volume of organic mixture. The agitation is ceased and a raffinate and extract phase allowed to form. The raffinate phase is found to contain appreciably less sulfur as sulfur bearing compounds than did the initial organic mixture.

Example VII

An organic mixture comprising a hydrocarbon fraction boiling in the range 100 to 225° C. and 7 percent by weight nitrogen as nitrogen bearing compounds is subjected to thorough agitation with ethyl-N-ethylglycinate in a ratio of 4 parts by volume of the solvent per volume of organic mixture. The agitation is ceased and a raffinate and extract phase allowed to form. The raffinate phase is found to be substantially lower in nitrogen content than the initial organic mixture.

Example VIII

A hydrocarbon mixture comprising methylcyclohexane and n-heptane in a 1:1 by volume ratio is subjected to thorough agitation with ethyl-N-tert butyl glycinate in a ratio of 5 parts by volume of the solvent per volume of the hydrocarbon mixture. The agitation is ceased and a raffinate and extract phase allowed to form. The raffinate phase is found to be lower in concentration of methylcyclohexane than the initial hydrocarbon mixture.

Example IX

A hydrocarbon mixture comprising toluene and n-heptane in a 1:1 by volume ratio is subjected to thorough agitation with ethyl-N-(3-methoxypropyl) glycinate in a ratio of 2 parts by volume of the solvent per volume of the hydrocarbon mixture. The agitation is ceased and a raffinate and extract phase allowed to form. The raffinate phase is found to be substantially lower in concentration of toluene than the initial hydrocarbon mixture.

Example X

A hydrocarbon mixture comprising 1-methyl naphthalene and 1,3,5-triethyl benzene in a 1:1 by volume ratio is subjected to thorough agitation with ethyl-N-tert butyl glycinate in a ratio of 3 parts by volume of the solvent per volume of the hydrocarbon mixture. The agitation is ceased and a raffinate and extract phase allowed to form. The raffinate phase is found to be substantially lower in concentration of 1-methyl naphthalene than the initial hydrocarbon mixture.

Example XI

A hydrocarbon mixture comprising hexadiene-1,3 and hexene-1 in a 1:1 by volume ratio is subjected to thorough agitation with ethyl-N-ethyl glycinate in a ratio of 2 parts by volume of the solvent per volume of the hydrocarbon mixture. The agitation is ceased and a raffinate and extract phase allowed to form. The raffinate phase is found to be substantially lower in concentration of hexadiene-1,3 than the initial hydrocarbon mixture.

The compounds useful in the practice of this invention are the derivatives of mono-carboxylic amino acids which are exemplified by the amino acid, glycine, whose formula is

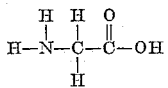

The derivatives are those which have been substituted by removal of the H from the hydroxy group and may or may not have been further substituted by removal of an H from the amine group. The derivatives of mono-carboxylic amino acids other than glycine are within the scope of this invention. These other acids are those wherein the internal methyl group is an alkyl group of two or more carbon atoms and wherein these alkyl groups may be straight or branched chain radicals. Non-limiting examples of such mono-carboxylic amino acids, other than glycine which are within the scope of this invention, are alanine, valine, norleucine, etc. These compounds may be prepared by any known method because this is not critical. The substituents replacing the hydrogens in the mono-carboxylic amino acid formula may be any hydrocarbon radical or substituted hydrocarbon radical wherein the number of carbon atoms is from 1 to 10 and those non-hydrocarbon substituent groups containing O, N, S, or X where X is a halogen.

Many different types of mixtures of compounds may be separated by the selective solvents of this invention, provided the mixtures are inert toward the solvent and the solubility characteristics of one or more of the components of the mixture is altered in regard to the other components. Thus, the solvents of this invention may be effective in the isolation of pure compounds, the separation of mixtures of organic compounds of different degrees of saturation such as aromatics, olefins, polyolefins, naphthenes and/or paraffins from various hydrocarbon mixtures containing them, and various purification processes, such as desulfurization, separation of oxygen containing compounds, nitrogen bearing compounds, and halogen compounds from mixtures containing them. Some specific non-limiting examples of mixtures which may be separated by the solvents of this invention are hydrocarbon mixtures such as ethane and ethylene; propane and propylene; butane, isobutane, alpha-, and beta- and iso-butylenes, butadiene, vinyl acetylene, ethyl acetylene; pentanes, pentenes, isoprene and piperylene; hexanes nad hexenes; gasoline distillates containing benzene, toluene, xylenes, ethyl benzene, mesitylene, cumene, etc.; ortho and para-xylene; naphthenes and paraffins, gasoline, kerosene, fuel oils, lubricating oils, halogenated hydrocarbons including ortho and para-chloronitrobenzene, those of organic substances containing water, such as aqueous alcohols including methyl, ethyl, propyl, alcohols; glycols; glycerines; chlorohydrins; organic acids including acetic, propionic, lactic, etc., esters including isopropyl acetate; ortho and para-nitrophenol; ortho and para-methoxy phenol; ortho and para-dihydroxy benzene; glycol chlorohydrin and glycol; glycol and glycol ethers; ethyl acetate and ethyl alcohol; nitroglycerine and glycerine; primary and secondary butyl alcohols; alkyl phenols such as ortho, meta and para-cresols; ortho and para-hydroxy benzaldehyde; ortho and para-ethoxy aniline; methyl propyl ketone and diethyl ketone; mixtures of resorcin, catechol and hydroquinone; terpenes or sesqui-terpenes from oxygen-containing compounds such as alcohols or aldehydes present therein; etc.

The solvents of this invention may be utilized as selective solvents alone or in combination with one another. Also, these solvents may be used in conjunction with other known solvents, selective solvents, and/or modifying agents. Non-limiting examples of such auxiliary solvents are water, methanol, ethanol, and higher alcohols, benzyl alcohol, furfural alcohol, glycols glycerols, acetone and other ketones, crotonaldehyde, furfural, and other aldehydes, nitriles, ethers, nitro hydrocarbons, and as anti-solvents propane, butane, pentane, hexane, heptane, and other aliphatic and alicyclic saturated hydrocarbons.

If auxiliary solvents are used, the amount employed may vary over wide ranges as from 0 to 95 percent by volume but with a more preferred amount being from 0 to 40 percent by volume.

Not only do the solvents of this invention possess utility in separation by solvent extraction but they find equal application in extractive distillation. Extractive distillation, of course, is nothing more than vapor-liquid solvent extraction and the two may be practically synonymous when speaking of systems wherein the mixture being separated is in the gaseous state at ordinary temperatures. The techniques may be somewhat different but the principle upon which separation is based remains the affinity of the solvent for one or more compounds of a mixture over the other compounds of the mixture.

In the practice of the present invention, the temperature at which a separation is carried out may range broadly from the freezing point of the solvent up to its decomposition temperatures. For an economically attractive process, it is desired that the optimum temperature range be approximately the ambient temperatures (10–40° C.) and that slight variations in temperature cause little or no noticeable change in selectivity of the solvent or in the solvent loading characteristics. In general, the temperature at which the mixture to be separated is contacted with the solvent is in the range from about 40° to about 150° F. A preferred temperature range for the solvents of this invention is 50 to 100° F. However, it is to be understood that the preferred temperature range will be greatly dependent upon the mixture being separated. Little difficulty will be experienced by those skilled in the art in determining the optimum temperature for any of the separations within the scope of this invention.

If the separation desired may be obtained more readily by extractive distillation than by solvent extraction with the solvents of this invention, then it may be necessary to use higher temperatures. The temperature will range between being above the bubble temperature of the mixture being separated and below the boiling point of the solvent. Suitable temperatures for the utilization of the solvents herein disclosed in extractive distillation processes may range from 0° C. or the bubble temperature of the mixture up to approximately 300° C. at pressures from 0.1 p.s.i.a. to 500 p.s.i.a. or higher.

The amount of solvent to be used in the application of the solvents of this invention to solvent extraction and extractive distillation may range from about 0.1 to 20 parts by volume of solvent per volume of the mixture to be separated. A more preferred ratio of solvent to mixture is approximately 1 to 10 parts by volume of solvent per volume of mixture.

The technique of contacting the solvents of this invention with the mixture to be separated may be any conventional method known for solvent extraction or extractive distillation which is adaptable to the physical characteristics of these solvents. The method of contact may be batchwise, concurrent, or countercurrent or variations of these.

What is claimed is:

1. The process of separating mixtures of organic compounds, said mixtures being selected from the group consisting of (A) mixtures of at least two hydrocarbon compounds of different degrees of saturation, said hydrocarbon compounds being selected from the group consisting of normally gaseous and normally liquid hydrocarbons, and (B) mixtures of naphthenes and paraffins, said process comprising contacting said mixtures with a selective solvent having the formula

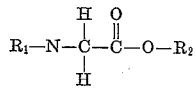

wherein $R_1$ is selected from the group consisting of alkyl radicals having from 1 to 10 carbon atoms and alkoxyalkyl radicals having from 1 to 10 carbon atoms and $R_2$ is an alkyl radical having from 1 to 10 carbon atoms in an amount sufficient to cause formation of extract and raffinate phases and separating said extract and raffinate phases.

2. The process of refining mixtures of hydrocarbon fractions and non-hydrocarbon impurities selected from the group consisting of sulfur-bearing and nitrogen-bearing organic compounds, said process comprising contacting said mixture with a selective solvent having the formula

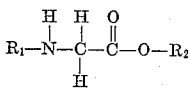

wherein $R_1$ is selected from the group consisting of alkyl radicals having from 1 to 10 carbon atoms and alkoxyalkyl radicals having from 1 to 10 carbon atoms and $R_2$ is an alkyl radical having from 1 to 10 carbon atoms in an amount sufficient to cause formation of extract and raffinate phases and separating said extract and raffinate phases.

3. The process of separating normally gaseous mixtures of at least two hydrocarbons of different degrees of saturation which comprises contacting said mixtures with a selective solvent having the formula

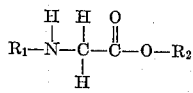

wherein $R_1$ is selected from the group consisting of alkyl radicals having from 1 to 10 carbon atoms and alkoxyalkyl radicals having from 1 to 10 carbon atoms and $R_2$ is an alkyl radical having from 1 to 10 carbon atoms in an amount sufficient to cause formation of extract and raffinate phases and separating said extract and raffinate phases.

4. The process of claim 1 wherein the mixture of naphthenes and paraffins is a mixture containing methylcyclohexane and n-heptane.

5. The process according to claim 1 wherein the mixture of at least two hydrocarbon compounds of different degrees of saturation contains olefinic hydrocarbons and paraffinic hydrocarbons.

6. The process according to claim 1 wherein the mixture of at least two hydrocarbon compounds of different degrees of saturation contains at least one aromatic hydrocarbon and at least one non-aromatic hydrocarbon.

7. The process according to claim 1 wherein the mixture to be separated is contacted with the selective solvent at elevated temperatures such that the mixture is above its bubble point but that the temperaure is below the boiling point of the selective solvent.

8. The process according to claim 1 wherein the mixture to be separated is contacted with the selective solvent at a temperature between 40 and 150° F.

9. The process according to claim 3 wherein the normally gaseous mixture of at least two hydrocarbons of different degrees of saturation contains butane, butenes and butadiene.

10. The process according to claim 3 wherein the selective solvent is ethyl-N-(3-methoxy propyl) glycinate.

11. The process according to claim 3 wherein the selective solvent is ethyl-N-ethyl glycinate.

12. The process according to claim 3 wherein the selective solvent is ethyl-N-tert. butyl glycinate.

13. The process according to claim 3 wherein the ratio of selective solvent to mixture is 0.1 to 20 volumes of solvent per volume of mixture.

14. The process according to claim 3 wherein the ratio of selective solvent to mixture is 1 to 10 volumes of solvent per volume of mixture.

References Cited in the file of this patent

UNITED STATES PATENTS

| | | |
|---|---|---|
| 2,054,050 | Clarke | Sept. 8, 1936 |
| 2,071,253 | Carothers | Feb. 16, 1937 |
| 2,191,767 | McCluer et al. | Feb. 27, 1940 |
| 2,370,530 | Gage | Feb. 27, 1945 |